Jan. 8, 1929.
J. C. MOORE, JR
1,697,994
COASTER
Filed Aug. 23, 1927
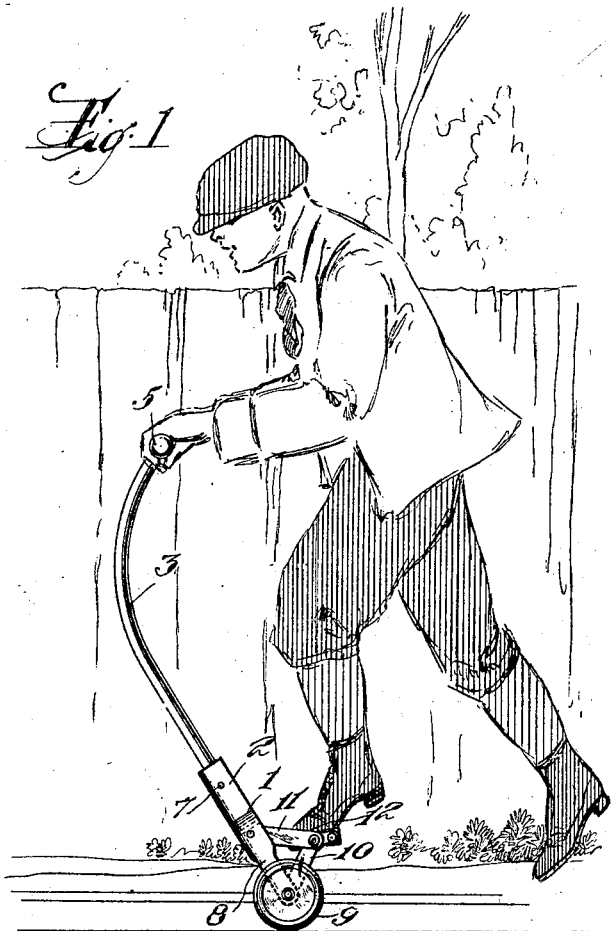
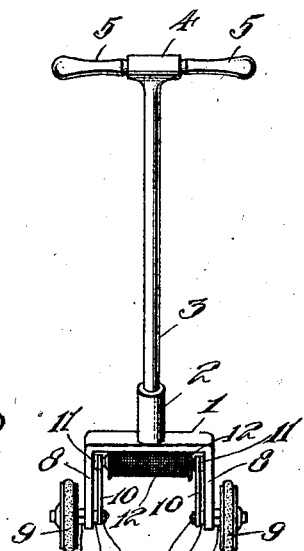
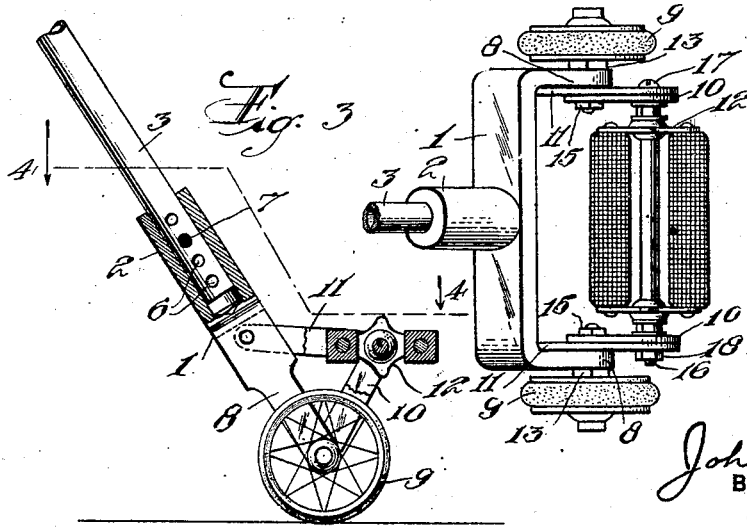
INVENTOR:
John C. Moore, Jr.
BY
Everett & Rook,
ATTORNEYS.

Patented Jan. 8, 1929.

1,697,994

UNITED STATES PATENT OFFICE.

JOHN C. MOORE, JR., OF CALDWELL, NEW JERSEY.

COASTER.

Application filed August 23, 1927. Serial No. 214,821.

This invention relates to a coaster, and more particularly a coaster having a wheeled fork with an upwardly extending handle and a rocking pedal upon said fork to receive the foot of the rider.

The objects of the invention are to secure a novel and improved construction of coaster upon which a rider can balance himself; to provide a foot support between the planes of two wheels mounted upon the same axial line, thus securing stability in sidewise directions and restricting balancing to forward and backward directions; to provide a rocking or pivoted pedal in such a coaster; to provide a handle curved so that the rider can stand erect and yet hold the device in proper position, and to obtain other advantages and results as may be brought out by the following description.

Referring to the accompanying drawings, in which like numerals of reference indicate the same parts throughout the several views, Figure 1 shows my improved coaster in side elevation as it is used;

Figure 2 is a front view of the same;

Figure 3 is a side elevation showing the fork and the pedal in section, and

Figure 4 is a plan of the coaster with the handle broken away.

In said drawings, the reference numeral 1 indicates a strong and heavy fork from the upper end or shank 2 of which a handle 3 projects and is provided at its upper end with a cross piece 4 having hand grips 5, 5. Preferably the handle is curved rearwardly as shown in Figure 1 and at its lower end is longitudinally adjustable in the shank 2 of the fork, such adjustability being shown provided by a number of transverse holes 6 in the handle, through any one of which holes a cross pin 7 extending through the shank 2 may be fitted.

The fork 1 is wheeled, preferably by mounting wheels 9, 9 at the lower ends of the arms 8, 8 of the fork 1, and at their outer sides, upon which wheels the coaster may freely run. Also from the lower ends of the arms 8, 8, and preferably from their inner sides, braces 10, 10 extend upwardly rearward to meet links 11, 11 which extend horizontally rearward from the upper ends of the arms 8, said braces 10 and links 11 at their meeting points receiving and pivotally supporting a pedal 12 which extends between the two pairs of braces and links. The pedal 12 thus lies above the level of the wheels 9, 9 and a little to the rear of the same, the handle 3 projecting upwardly and forwardly from the wheels. It will also be noted that the pedal lies between the planes of the arms 8, 8 of the fork and between the planes of the wheels 9, 9, so that no sidewise balancing of the rider is required. It is thus in backward and forward directions that balancing is required of the rider, and to facilitate this the pedal 12 is rotatable or rocking, like a bicycle pedal. The preferable arrangement of the pedal at a height above the wheels or axial line thereof enhances the difficulty of balancing and the sport of the rider. Obviously, this height can be varied as desired, in building the coasters.

The wheels 9, 9 may be supported upon the fork 1 in any suitable manner but I have shown them as mounted upon the outer ends of studs 13 one screwed into each of said arms 8 and provided at its end with a washer 14 against which the brace 10 lies, a nut 15 at the other side of said brace clamping all said parts together. The pedal 12 is of any ordinary and well-known construction mounted upon a rod 16 extending through the overlapping ends of the braces 10 and links 11 and secured outside the same in any proper and suitable manner as by a head 17 at one end and a nut 18 at the other.

Various modifications may be made in manufacturing my invention, by those skilled in the art, without departing from the spirit and scope of the invention, and therefore I do not wish to be understood as limiting myself except as required by the following claims when construed in the light of the prior art.

Having thus described my invention, what I claim is:

1. A device of the character described, comprising a wheeled fork, an upwardly and forwardly projecting handle, and a rotatable foot pedal at the rear of said fork and above its wheeled end.

2. A device of the character described comprising a pair of wheels, means for mounting said wheels in axial alinement and spaced from each other, an upwardly projecting handle, and a rotatable foot pedal between the planes of said wheels.

3. A device of the character described comprising a fork, wheels, one for each of the arms of said fork, a handle for said fork, and a pedal between the planes of said wheels rotatable with respect to said fork.

4. A device of the character described, comprising a handled fork, wheels, one for each of the arms of said fork, supports extending rearwardly from said arms above the axis of said wheels, and a pedal mounted between said supports.

5. A device of the character described comprising a handled fork, wheels for the arms of said fork, braces extending rearwardly upward from said arms, links extending rearward from the fork to said braces, and a pedal mounted between said braces and links.

JOHN C. MOORE, Jr.